June 17, 1947.  H. BECKER ET AL  2,422,611
MEASURING TABLE
Filed Jan. 18, 1940  2 Sheets-Sheet 1
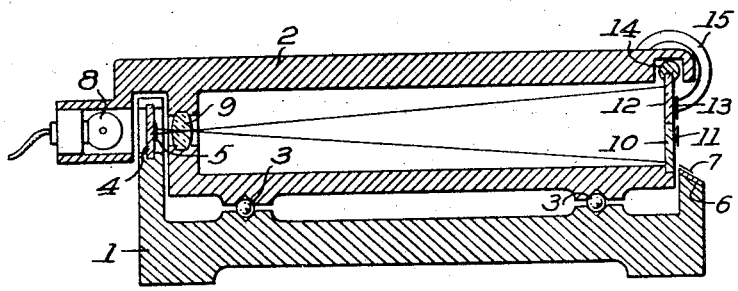
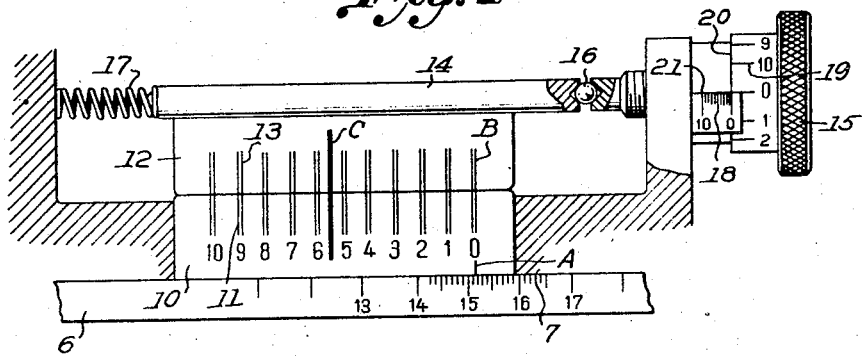
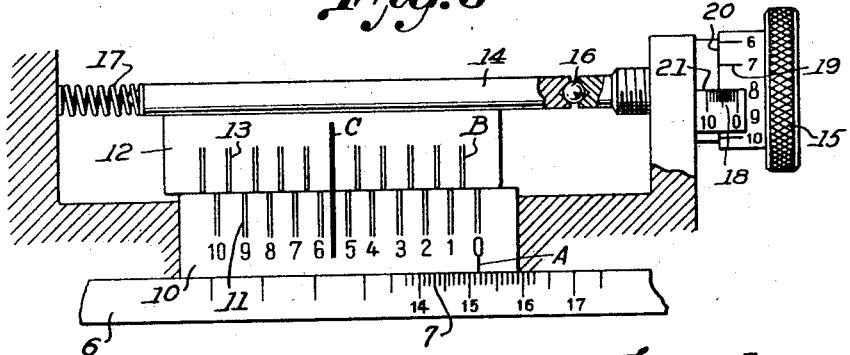
Inventors.
HELMUT BECKER
HEINRICH BROSCHKE
By Hans E. Q. Konigsberg
Attorney.

June 17, 1947.  H. BECKER ET AL  2,422,611
MEASURING TABLE
Filed Jan. 18, 1940  2 Sheets-Sheet 2

Inventors.
HELMUT BECKER
HEINRICH BROSCHKE

Patented June 17, 1947

2,422,611

UNITED STATES PATENT OFFICE 2,422,611

MEASURING TABLE

Helmut Becker and Heinrich Broschke, Wetzlar, Germany; vested in the Attorney General of the United States Application January 18, 1940, Serial No. 314,412 In Germany January 5, 1939

Sections 3 and 14, Public Law 690, August 8, 1946. Patent expires January 5, 1959

8 Claims. (Cl. 88—24)

1

The object of this invention is to provide an improved measuring table of the type which is used in workshop control microscopes, toolmakers microscopes and other like machines. The principal improvement intended by this invention is to provide means for optically projecting a magnified image of the main measuring scale in a plane in which other sub-scales are located and operable. The invention also includes a laterally displaceable measuring stage and means for reading with a high degree of accuracy the displacement of the stage. The invention will be best understood by referring at once to the accompanying drawing and the following description of the invention. In the said drawing:

Fig. 1 is a sectional view of the measuring table according to this invention.

Figs. 2 and 3 are front views of the front scale members showing the same in two different positions, parts being broken away and omitted.

Figure 4:
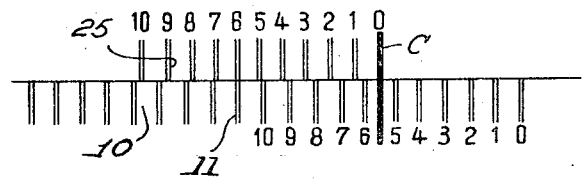
Fig. 4 shows modified scale members.

The measuring table comprises a base 1 and a laterally displaceable stage 2 which moves on ball bearings 3. The base carries a glass rule 4 which is engraved with a millimeter scale indicated at 5 but without any description or numbers. In front the base carries a rule 6 engraved with a millimeter scale 7. The scales 5 and 7 are identical and the two rules 4 and 6 are placed in exact parallel alinement and so that the corresponding millimeter marks in the scales 5 and 7 are in exact coincidental alinement. The rule 4 is not separately illustrated because it would be merely a duplication of the rule 6 but without the numbers of scale 7. Only a portion of the rule 6 is shown, same being sufficient for understanding the invention.

The stage 2 carries an electric lamp 8 and an optically magnifying system 9. In front the stage carries two rules preferably of ground glass. These two rules are mounted in the same plane. The lower rule 10 carries a scale 11 consisting of ten double or single lines. The total space including the zero line and the tenth line occupies exactly the same space as one magnified interval of the scale 5. Thus one space on scale 11 is equal to one-tenth of a millimeter or interval of scale 5.

The upper rule 12 carries a scale 13 which is a duplicate of the scale 11 but without numbers. The upper rule 12 is movable across the lower rule 10 by a micrometer spindle 14 operable by the micrometer knob 15. In order to eliminate

2 idle motion the micrometer spindle 14 is held between a ball bearing 16 and a spring 17. On the side of the stage 2 there is mounted a vernier scale 18 and the micrometer knob carries a scale 19 with intervals corresponding to one-thousandth of a millimeter. In order to displace the scale 13 by the space of one interval with relation to the scale 11 the micrometer spindle has to make ten revolutions.

The arrangement and relation of the several scales is as follows: One-tenth of a turn of the knob 15 corresponds to one-hundredth of an interval of the scales 11 and 13. One interval of the latter is equal to one-tenth of a magnified interval of the scale 5. The venier 18 cooperates with the edge 20 of the knob 15 as will be understood.

The measuring table may be used to measure an unknown distance or it may be used to displace the stage a known distance. Normally or at zero position the zero mark A on the scale 11 points to the zero mark on the fixed front scale 7—this latter zero mark is not shown as it would make the scale 6 too long in the drawing and is unnecessary for understanding the invention. Also the not numbered zero mark B on the micrometer scale 13 is alined with the mark A. The edge 20 of the knob 15 is alined with the zero mark of the vernier 18. The zero of scale 19 is alined with the upper edge 21 of the vernier, Fig. 2.

When the measuring table is to be used the lamp is turned on and we now see upon the ground glass rules 10 and 12 the magnified image C of the one millimeter division line on the scale 5 which happens to be in the optical axis of the optical system 9. This projected image will be lined up with the one endpoint of the distance to be measured. Thereafter the stage is moved across the base and the micrometer spindle rotated until the mark C is in alinement with the other endpoint of the distance. We now read the scales to ascertain the distance measured. The positions of the several scales are shown in Fig. 3 from which we find that the distance measured is 151.568 millimeters. This figure we read from the scales as follows: First from the position of the mark A we read on the scale 7 a movement of between 151 and 152 mm. The projected mark C is between the lines 5 and 6 on the scale 11, hence the movement is at least 151.5 mm. The edge 20 on the micrometer knob 15 stands between the sixth and seventh line on the vernier 18. Consequently we read that the distance moved is at least 151.56 mm. Finally we see that the eighth line on the micrometer scale 19 is alined with the edge 21 of the vernier which gives us the reading of 151.568 mm.

If the length of the movement is known to be 151.568 mm. and it is desired to mark accordingly, the operator first rotates the micrometer knob until the line 8 on the scale 19 registers with the edge 21 of the vernier as shown in Fig. 3. Thereafter the stage is displaced across the base until the mark A stands between 151 and 152 mm. The movement is now continued until the projected mark C covers or is alined with the sixth double (or single) line on the scale 13.

Fig. 4 shows a modification in which the scale 13 is in the form of a vernier 25. In this case the one-thousand values must be estimated. Also the division marks on the scale 11 must be twice the length of a double interval of the main scale 5.

Figure 5:
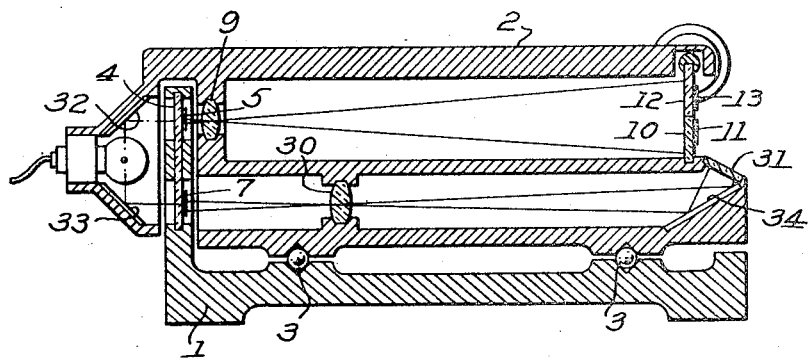
Fig. 5 shows a construction modified from that shown in Fig. 1.

Fig. 5 illustrates a modification in which the rule 6 with scale 7 is mounted in the same plane or adjacent to the main rule 4 and scale 5, and the image of the scale 7 is projected upon a ground glass which occupies the same position as the rule 6 in Fig. 1. There are cases in which the main rule 4 and the other rule 6 on the base must be located rather widely apart. It is obvious that in such cases it is very difficult and expensive to position these two rules and scales in exact alinement and adjustment. The construction in Fig. 5 overcomes this difficulty. Similar parts in Fig. 5 are designated with the same reference numbers as are used for like parts in Fig. 1.

In Fig. 5 the rule 4 is enlarged and carries both the main scale 5, without description or numbers, and also the scale 7 which is similar to the scale 7 in Fig. 1. The latter is magnified by means of an additional optical system 30 and projected upon a ground glass 31 which occupies the same position as the rule 6 in Fig. 1. Mirrors 32, 33 and 34 are included in the optical projection systems arranged in an obvious manner. The scale 7 is magnified to a lesser degree than the scale 5 so that the projected figures do not appear too large. The measuring table according to Fig. 5 possesses the advantage that the projected images of the two scales may be placed to the same side. The scale 5 is projected as in Fig. 1 and the scale 7 is projected by means of the mirror 34 upon the ground glass 31 and may thus be read conveniently as in Fig. 1. It is obvious that the greatest exactness may be obtained in placing both the scales 5 and 7 upon the same glass rule 4.

The invention as herein disclosed has for its object to save expense and labor in preparing rules and scales for subdivision of such small measures as that of one millimeter and also to save expense and labor in mounting such scale members in exact adjusted positions. The disclosure accomplishes the objects sought.

We claim:

1. A measuring table as described comprising a base, a measuring stage movably supported thereon, two identical main scales carried by said base in exact measuring parallel alinement, one of said scales being non-descriptive, the other of said scales having descriptive numbers identifying the divisions on said other scale, two relatively movable ground glass rules carried by said stage and mounted in the same plane, said rules bearing identical subdivision scales of said main scales, one of said ground glass subdivision scales being non-descriptive, means for moving one of said subdivision scale rules relative to the other subdivision scale rule and optical means for projecting the magnified image of an interval on said non-descriptive main scale upon the said ground glass rules.

2. A measuring table according to claim 1 characterized by a micrometer device for moving one of said ground glass rules relative to the other ground glass rule, said micrometer device bearing a scale which is a subdivision of the intervals on the said two sub-division scales.

3. A measuring table according to claim 1 characterized by that the two sub-division ground glass rules are mounted in the same plane which is coincidental with the plane of the projected magnified image of the non-descriptive main scale.

4. A measuring table according to claim 1 characterized by that the values of the descriptive main scale on the base is readable with reference to the zero mark on the descriptive ground glass scales.

5. A measuring table according to claim 1 characterized by that the non-descriptive main scale bears only the lines of division of said scale and no descriptive numbers thereof.

6. A measuring table comprising a base, a measuring stage movably supported thereon, a single main scale supporting member on said base, two identical main scales carried by said member, one of said main scales being non-descriptive the other being descriptive, two relatively movable ground glass rules carried by said stage and mounted in the same plane and bearing identical sub-divisions of said main scales, one of said ground glass subdivision scales being non-descriptive, a third ground glass member arranged at an angle to said ground glass rules, optical means for projecting the magnified image of the intervals of said non-descriptive main scale upon the said two relatively movable ground glass rules and other optical means for projecting the magnified image of the other descriptive main scale upon the said angularly arranged ground glass member.

7. A measuring table according to claim 6 characterized by that the magnification of the non-descriptive main scale is greater than the magnification of the descriptive main scale.

8. A measuring table according to claim 6 characterized by that the optical magnifying systems and reflecting mirrors are arranged to project the magnified images of the main scales at the same point or side of the table.

HELMUT BECKER.
HEINRICH BROSCHKE.

REFERENCES CITED

The following references are of record in the file of this patent:

UNITED STATES PATENTS

| Number | Name | Date |
| --- | --- | --- |
| 1,974,606 | Fassin | Sept. 25, 1934 |
| 1,544,090 | Eppenstein | June 30, 1925 |
| 1,589,796 | Eppenstein | June 22, 1926 |
| 2,130,710 | Alexander | Sept. 20, 1938 |

FOREIGN PATENTS

| Number | Country | Date |
| --- | --- | --- |
| 362,913 | Germany | Nov. 2, 1922 |